United States Patent
Gonzalez Bautista et al.

(10) Patent No.: US 12,371,008 B2
(45) Date of Patent: Jul. 29, 2025

(54) CONTROL METHOD FOR CONTROLLING THE LATERAL MOVEMENT OF A MOTOR VEHICLE

(71) Applicant: RENAULT S.A.S., Boulogne Billancourt (FR)

(72) Inventors: David Gonzalez Bautista, Saint Cyr l'école (FR); Vicente Milanes, Boulogne-Billancourt (FR); Francisco Martin Navas Matos, Paris (FR)

(73) Assignee: AMPERE S.A.S., Boulogne Billancourt (FR)

( * ) Notice: Subject to any disclaimer, the term of this patent is extended or adjusted under 35 U.S.C. 154(b) by 236 days.

(21) Appl. No.: 18/042,816

(22) PCT Filed: Aug. 24, 2021

(86) PCT No.: PCT/EP2021/073408
§ 371 (c)(1),
(2) Date: Feb. 24, 2023

(87) PCT Pub. No.: WO2022/043331
PCT Pub. Date: Mar. 3, 2022

(65) Prior Publication Data
US 2023/0311860 A1    Oct. 5, 2023

(30) Foreign Application Priority Data
Aug. 26, 2020   (FR) ...................... 2008715

(51) Int. Cl.
*B60W 30/09*   (2012.01)
*B60W 30/095*   (2012.01)
(Continued)

(52) U.S. Cl.
CPC ........ *B60W 30/09* (2013.01); *B60W 30/0956* (2013.01); *B60W 50/14* (2013.01);
(Continued)

(58) Field of Classification Search
CPC .. B60W 30/09; B60W 30/0956; B60W 50/14; B60W 60/0015; B60W 2554/20; B60W 2554/402; B60W 2720/24
See application file for complete search history.

(56) References Cited

U.S. PATENT DOCUMENTS

| | | | |
|---|---|---|---|
| 2009/0009305 A1* | 1/2009 | Kataoka | ................. G08G 1/167 340/439 |
| 2015/0134218 A1* | 5/2015 | Ishida | ...................... B60T 7/12 701/1 |

FOREIGN PATENT DOCUMENTS

| | | |
|---|---|---|
| EP | 1 884 449 A1 | 2/2008 |
| EP | 2 978 648 A1 | 2/2016 |
| WO | WO-2014121973 A1 * 8/2014 | .......... B60W 10/184 |

OTHER PUBLICATIONS

International Search Report issued Oct. 11, 2021 in PCT/EP2021/073408 filed on Aug. 24, 2021 2 pages.
(Continued)

*Primary Examiner* — Tarek Elarabi
(74) *Attorney, Agent, or Firm* — Oblon, McClelland, Maier & Neustadt, L.L.P.

(57) ABSTRACT

A control method for controlling the lateral movement of a motor vehicle including a steering structure for following a predetermined trajectory on a road. The control method includes selecting at least one environmental parameter external to the motor vehicle. The selection of the environmental parameter is a function of a collision risk associated with this environmental parameter. The command for the steering structure is determined according to the collision risk and according to the lateral shift of the motor vehicle.

13 Claims, 9 Drawing Sheets

(51) Int. Cl.
*B60W 50/14* (2020.01)
*B60W 60/00* (2020.01)

(52) U.S. Cl.
CPC ..... *B60W 60/0015* (2020.02); *B60W 2554/20* (2020.02); *B60W 2554/402* (2020.02); *B60W 2720/24* (2013.01)

(56) References Cited

OTHER PUBLICATIONS

French Preliminary Search Report issued May 25, 2021, in French Application No. 2008715 filed Aug. 26, 2020 (with English Translation of Categories of Cited Documents), 3 pages.

\* cited by examiner

CONTROL METHOD FOR CONTROLLING THE LATERAL MOVEMENT OF A MOTOR VEHICLE

TECHNICAL FIELD

The present invention relates to a control method for controlling the lateral movement of a motor vehicle, a control system for controlling said lateral movement, a computer program product comprising program instructions that can be used by said control system, and an autonomous or semi-autonomous motor vehicle comprising said control system.

PRIOR ART

In recent years, the progress made in equipping motor vehicles with driving assistance systems has contributed to a significant improvement in road safety. The challenge for the future is to design autonomous motor vehicles. An autonomous motor vehicle is a motor vehicle capable of traveling on the open road with little or no intervention by a driver. The aim of the concept is to develop and produce a vehicle that can ultimately travel completely safely on a public road, regardless of the traffic generated by other vehicles or obstacles (humans, animals, trees, etc.) present on the road. Here, the notion of an autonomous motor vehicle covers a fully autonomous motor vehicle in which no intervention by a human operator is necessary to drive said vehicle. This notion also covers a so-called "semi-autonomous" motor vehicle having automated driving assistance systems but in which intervention by the human operator remains important overall.

The operation of an autonomous motor vehicle is generally governed jointly by an onboard navigation device and by a device for defining a predetermined trajectory. The onboard navigation device is designed to program a route on a large scale, that is, on the scale of a road network.

This route comprises a series of consecutive road sections capable of connecting a starting position to a destination. This series of road sections is potentially dynamically variable depending on the traffic conditions detected or predefined travel restrictions on the road network (closure of certain stretches for roadworks, for example). The device for defining a predetermined trajectory is designed to automatically process travel trajectories of vehicles on a local scale, of the order of several tens or hundreds of meters. This device for defining a predetermined trajectory is capable of implementing the route programmed by the navigation system. Such implementation is carried out by determining the position, direction and speed of the vehicle over time as a function of the movement restrictions, such as dynamic restrictions of the motor vehicle (maximum speed, longitudinal acceleration, steering angle, etc.), environmental restrictions (obstacles on the road, etc.) or optimization restrictions (minimizing the lateral acceleration of the motor vehicle, for example).

In an autonomous driving context, a motor vehicle is arranged to follow a predefined urban or extra-urban route by travelling on a series of road sections determined by the onboard navigation device. The predetermined trajectory is defined by a set of Cartesian coordinates that are variable over time and calculated in real time as a function of the road section through which the predefined route is achieved and environmental parameters. This calculation can be implemented using a road marking recognition device, radar or laser detection means, an obstacle recognition device, etc.

When traveling, the motor vehicle follows an actual trajectory that can be different from the predetermined trajectory. In fact, when traveling, the motor vehicle is subject to a number of restrictions (tire pressure, gradient of the road, wind strength, etc.) that might not be taken into account by the device for defining the predetermined trajectory. As a result, there can be a lateral offset between this actual trajectory and the predetermined trajectory, which must be minimized. Lateral offset is given to mean a non-zero distance between the actual trajectory and the predetermined trajectory, measured along an axis normal to said predetermined trajectory. It is possible to correct this offset with an appropriate command from a lateral control system in order to change the steering angle of the motor vehicle.

U.S. Pat. No. 10,026,317 discloses a method for controlling a motor vehicle based on fuzzy logic. This method comprises a step of determining a probability of deviation from a determined trajectory, a determined position, a determined speed and a determined acceleration of an autonomous vehicle. A probability factor is calculated on the basis of this information. This factor indicates the probability that an action performed by a driver was performed to bring the vehicle into a safe state. This probability will enable transition between an autonomous mode, a semi-autonomous mode, and a manual mode in which an action by the driver is required due to a malfunction of the motor vehicle. This method using fuzzy logic attempts to reproduce the behavior of a human being when the motor vehicle is in an autonomous mode. However, this vehicle can receive different types of passenger/driver who can have varying expectations when they are on board the motor vehicle. Some passengers might desire smooth, even driving, while others might prefer much sportier driving. There is therefore diversity in the expectations of the users of an autonomous vehicle. In addition, fuzzy logic requires a relatively long learning time, which makes setting up this method of controlling the motor vehicle more complex.

There is therefore a need to propose a control method for controlling the lateral movement of a motor vehicle that is simple and convenient to implement and makes it possible to take into account a larger number of parameters for the automatic driving of said motor vehicle.

DISCLOSURE OF THE INVENTION

The present invention aims to at least partially meet this need.

More particularly, the present invention aims to improve the experience of the passengers in an autonomous vehicle.

A first object of the invention relates to a control method for controlling the lateral movement of a motor vehicle, said motor vehicle comprising steering means in order to follow a predetermined trajectory on a road. The control method comprises a step of determining a lateral offset of said motor vehicle relative to said predetermined trajectory and a step of determining a command for controlling the steering means of the motor vehicle. These steering means are capable of changing the direction of said motor vehicle so as to correct the lateral offset. The control method also comprises a step of selecting at least one environmental parameter external to the motor vehicle, said selection of said environmental parameter being a function of a risk of collision with said motor vehicle. The command for the steering means is determined according to said collision risk and according to said lateral offset of the motor vehicle.

Internal parameters of the motor vehicle are thus taken into account for controlling the steering means, as well as environmental parameters external to said motor vehicle. It is then possible to incorporate a collision risk into the command decision and control the correction of the lateral offset accordingly. For example, if the motor vehicle is offset towards an edge of the road, the presence of another vehicle travelling in the other direction on the opposite side of the road generates a low risk of collision for the motor vehicle. As a result, it is possible to provide a slow correction of the lateral offset, that is, without a sudden change being made to the direction of travel of the motor vehicle. Conversely, if the motor vehicle is offset towards the dividing strips of the road and another motor vehicle is coming in the opposite direction, the risk of collision is high, and the response from the steering means must therefore be much more dynamic in order to avoid any collision. The invention thus makes it possible to improve the adjustment of the control of the lateral movement of the motor vehicle as a function of the internal and external parameters of said motor vehicle while improving the passenger experience.

In one particular embodiment, the environmental parameter is at least one parameter selected from the following list of parameters:
 a parameter representing the road traffic;
 a parameter representing a mobile actor on the road, such as a human being or an animal;
 a parameter representing an immobile obstacle on the road.

In another particular embodiment, the speed of correction of the lateral offset is adjusted as a function of the collision risk and the lateral offset.

In another particular embodiment, the correction of the lateral offset is slowed down if the collision risk is low in light of the lateral offset of the motor vehicle. The automatic driving of the motor vehicle is thus made smoother.

In another particular embodiment, the correction of the lateral offset is accelerated if the collision risk is high in light of the lateral offset of the motor vehicle. The automatic driving of the motor vehicle is thus made safer.

In another particular embodiment, the correction of the lateral offset is damped as a function of the collision risk and the lateral offset. The way in which the motor vehicle follows the predetermined trajectory is thus made stable over time.

In another particular embodiment, the control method comprises a step of information in the motor vehicle, said information relating to a traveling situation of said motor vehicle. This information step takes place using human-machine interface means. These means make it possible in particular to warn a driver if they must retake control of the steering wheel, in particular when traveling in an autonomous vehicle.

Another object of the invention relates to a control system for controlling the lateral movement of a motor vehicle, said vehicle comprising steering means in order to follow a predetermined trajectory on a road. This control system comprises means for determining a lateral offset of the motor vehicle relative to the predetermined trajectory, means for determining a command for controlling the steering means of the motor vehicle, said steering means being capable of changing the direction of said motor vehicle so as to correct said lateral offset. The control system also comprises means for selecting at least one environmental parameter external to the motor vehicle, said selection of said environmental parameter being a function of a risk of collision with said motor vehicle. The command for the steering means is determined according to said collision risk and according to said lateral offset of the motor vehicle.

In one particular embodiment, the control system comprises human-machine interface means for informing a passenger of a traveling situation of said motor vehicle.

Another object of the invention relates to a computer program product comprising program instructions that can be used by the aforementioned control system which, when they are executed or interpreted by said control system, trigger the implementation of the aforementioned control method in a motor vehicle.

Another object of the invention relates to an autonomous motor vehicle comprising a control system according to one of the aforementioned objects.

The present invention will be better understood on reading the detailed description of embodiments given by way of non-limiting example and illustrated by the appended drawings, in which.

The invention is not limited to the embodiments and variants described, and further embodiments and variants will be clearly apparent to a person skilled in the art.

In the various figures, elements that are identical or similar have the same reference signs.

Figure 1:
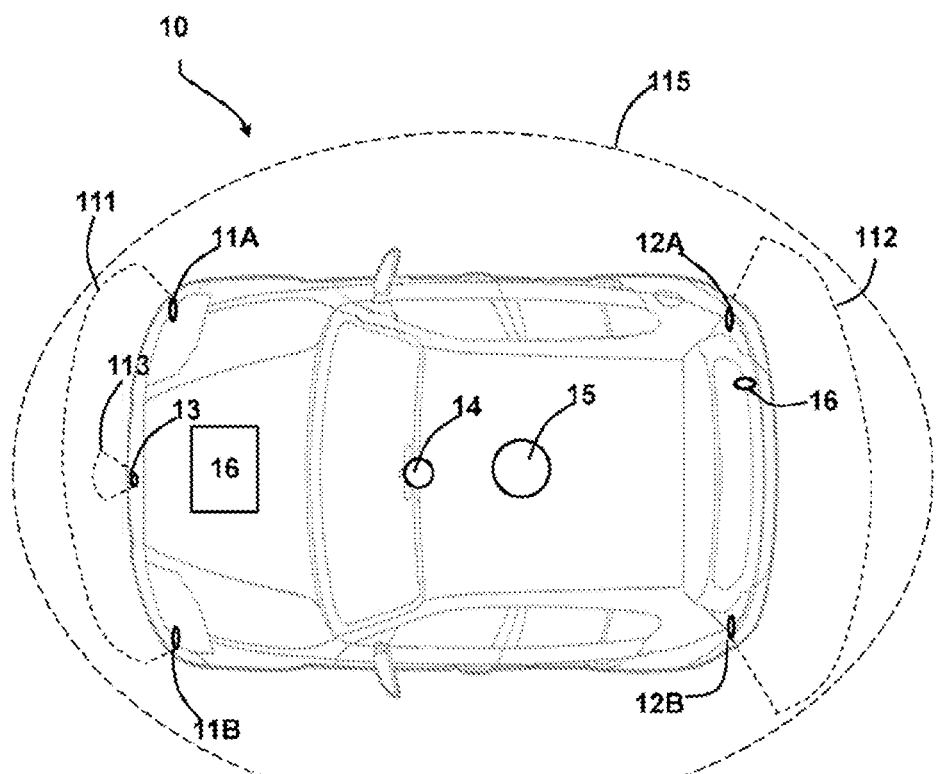
FIG. 1 is a diagrammatic view illustrating an autonomous motor vehicle according to the invention.

FIG. 1 shows a diagrammatic top view of a motor vehicle 10 according to the present invention. This motor vehicle 10 comprises a vehicle front portion, a vehicle rear portion, a vehicle roof, a vehicle interior, and steering means (not shown). The motor vehicle also comprises a chassis and one or more body panels mounted or secured on said chassis.

Here, the motor vehicle 10 is an autonomous vehicle. Autonomous vehicle is given to mean a fully autonomous or semi-autonomous motor vehicle. There are several levels of autonomy in a motor vehicle.

In a first level, known as level 1, the motor vehicle is responsible for a limited number of driving operations associated with said motor vehicle. In this case, the driver remains responsible for most of the driving control operations. In level 1, the acceleration and/or braking control operations (cruise control, etc.) are controlled by the motor vehicle. Level 1 corresponds to a driving assistance level.

In a second level, known as level 2, the motor vehicle is capable of collecting information (for example, via one or more driving assistance systems, sensors, etc.) about the external environment (the road around the motor vehicle, the road surface, the road traffic, the ambient conditions). In level 2, the autonomous vehicle is capable of using the information collected in order to control certain driving operations (for example, steering, acceleration, and/or braking). Level 2 is a level of partial automation of the motor vehicle. It should be noted that in level 1 and level 2, the driver must fully monitor the driving operations performed by the autonomous motor vehicle.

In a third level, known as level 3, the driver delegates all of the driving operations to the motor vehicle apart from when said motor vehicle asks the driver to act or intervene to control one or more of these driving operations. Level 3 is a level of conditional automation.

In a fourth level, known as level 4, the driver no longer manages any of the driving operations. In this case, the motor vehicle controls all of the driving operations, including when the driver does not respond to a request to intervene. Level 4 is a level of high automation.

In a fifth level, known as level 5, the motor vehicle controls all of the driving operations. When traveling, the motor vehicle thus monitors the road traffic, the mobile actors on the road (human beings, animals), the immobile obstacles on the road, the road surface. In level 5, no interaction with a human driver is required. Level 5 is a level of full automation. It should be noted that in levels 3 to 5, the motor vehicle is capable of monitoring the driving operations and monitoring the external environment of said motor vehicle.

In order to be able to perform the various driving operations in these different levels of autonomy, the motor vehicle 10 comprises a number of sensors, such as:
 a front radar 11A, 11B;
 a rear radar 12A, 12B;
 an ultrasonic sensor 13;
 a video camera 14;
 a LIDAR sensor 15;
 a GPS antenna 16.

The front radar comprises two front radar elements 11A, 11B positioned on the vehicle front portion on either side of an axis of symmetry of said motor vehicle 10. The front radar has a detection zone 111 at the front of the motor vehicle. It is thus capable of detecting the positions of the surrounding objects. It makes it possible to measure the speed of the motor vehicle. The information gathered by the front radar 11A, 11B is particularly useful for implementing certain driving operations such as emergency braking or lane holding.

The rear radar comprises two rear radar elements 12A, 12B positioned on the vehicle rear portion on either side of the axis of symmetry of said motor vehicle 10. The rear radar has a detection zone 112 at the rear of the motor vehicle. It is thus capable of detecting the positions of the surrounding objects. It makes it possible to measure the speed of the other motor vehicles following said motor vehicle 10. The information gathered by the rear radar 12A, 12B is particularly useful for implementing certain driving operations such as emergency braking or lane holding.

The ultrasonic sensor 13 is positioned on the front portion of the vehicle between the two front radar elements 11A, 11B. The ultrasonic sensor 13 has a much smaller detection zone 113 than the detection zone 111 of the front radar 11A, 11B. This ultrasonic sensor 13 is thus capable of detecting very close obstacles. The information gathered is particularly useful for implementing driving operations such as maintaining a safe distance from another motor vehicle directly in front of said motor vehicle 10.

Here, the video camera 14 is situated behind the rear view mirror. The information gathered by this video camera 14 is particularly useful for implementing certain driving operations such as deciphering road signs, identifying curbs and dividing strips, and detecting mobile actors on the road (human beings, animals).

Here, the LIDAR (LIght Detection And Ranging) sensor 15 is situated on the roof of the motor vehicle 10. It makes it possible to take remote sensing measurements using a laser. Light detection and ranging is a remote measuring technology based on the analysis of the properties of a light beam returned to its source. The LIDAR sensor has a fairly large detection zone 115, for example of the order of 50 meters in diameter. It makes it possible to constantly scan the environment over 360° in order to produce a 3D map thereof. The information gathered by the LIDAR sensor 15 is useful for implementing certain driving operations such as detecting obstacles, including at night.

The GPS antenna 16 is situated on the rear portion of the motor vehicle 10. It makes it possible to receive GPS (Global Positioning System) signals. The navigation data can then be updated in the motor vehicle 10 on the basis of these GPS signals.

The motor vehicle also comprises a central computer 16 capable of processing the various data from the sensors 11A, 11B, 12A, 12B, 13, 14, 15. The central computer 16 and the sensors 11A, 11B, 12A, 12B, 13, 14, 15 are connected in the motor vehicle by one or more CAN buses (Controller Area Networks) (not shown) for carrying said data from the sensors.

Figure 2:
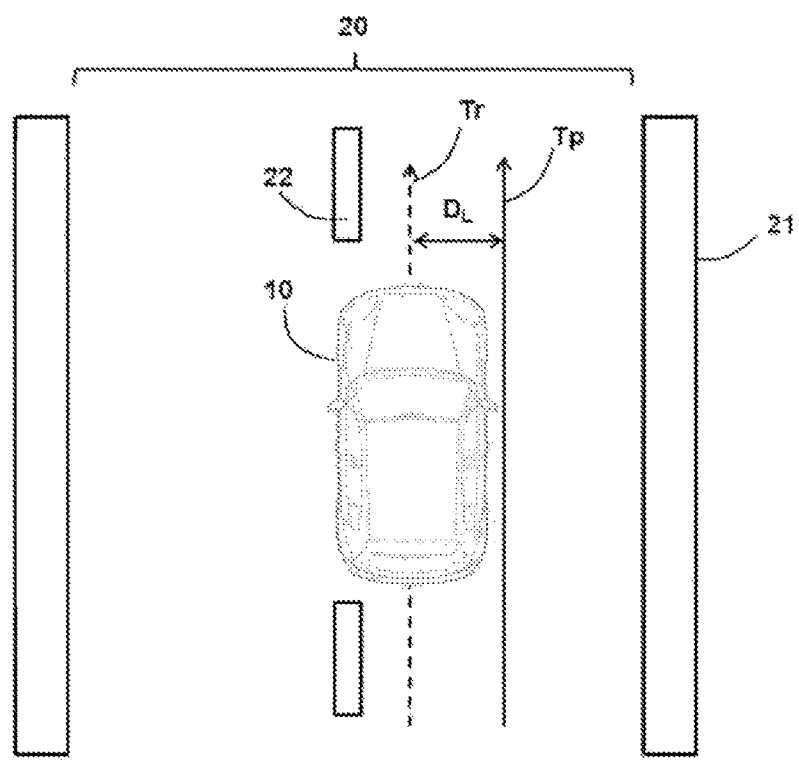
FIG. 2 illustrates the autonomous motor vehicle in FIG. 1 during operation on a road.

FIG. 2 illustrates the autonomous motor vehicle in FIG. 1 on a road 20. In order to simplify this illustration, the sensors 11A, 11B, 12A, 12B, 13, 14, 15 are not shown in FIG. 2. The road 20 is delimited by two curbs 21. It is also divided into two lanes separated by a plurality of dividing strips 22. In FIG. 2, the vehicle is driving in the right-hand lane following an actual trajectory $T_r$. Here, this actual trajectory $T_r$ is offset by a lateral offset $D_L$ relative to a predetermined trajectory $T_p$. The predetermined trajectory $T_p$ was calculated in advance by the navigation system of the motor vehicle 10, in particular on the basis of the data from the GPS signals received by the GPS antenna 16. Here, this predetermined trajectory $T_p$ extends half way between the curb 21 and the dividing strips 22. The invention aims to minimize the lateral offset $D_L$. To this end, the motor vehicle 10 comprises an adapted control system 30 illustrated in FIG. 3. In a preferred embodiment, this control system 30 is incorporated directly into the central computer 16 of the motor vehicle.

Figure 3:
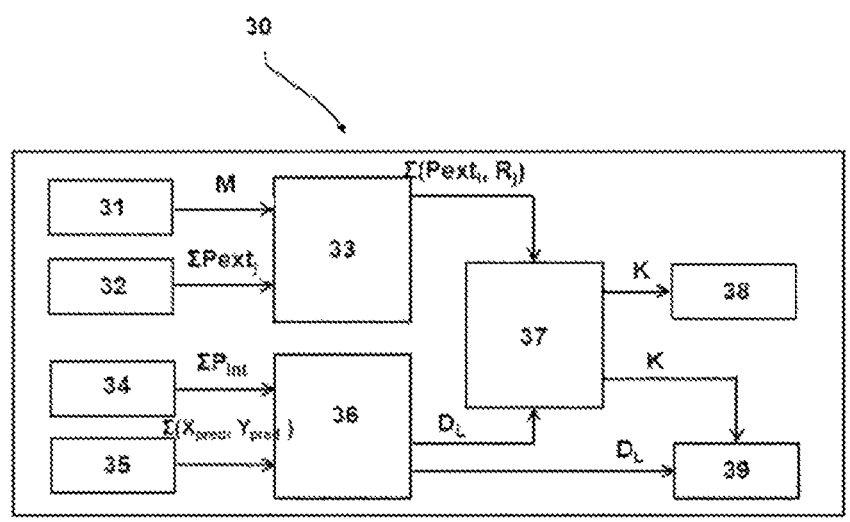
FIG. 3 is a diagram illustrating a control system for controlling the lateral movement of the motor vehicle in FIG. 1 on the road in FIG. 2.

FIG. 3 illustrates the control system 30 in greater detail. As stated above, this control system 30 is capable of controlling the lateral movement of the motor vehicle 10. It comprises:
 means 31 for generating a map;
 means 32 for generating environmental parameters;
 a collision risk analyzer 33;
 means 34 for collecting data internal to the motor vehicle;
 means 35 for generating a predetermined trajectory;
 an angular error and lateral error calculator 36, also known as means for determining a lateral offset;
 means for determining naturalistic planar behavior, also known as means 37 for determining a command for controlling the steering means of the motor vehicle 10;
 means 38 for controlling the lateral offset;
 human-machine interface means 39.

The means 31 for generating a map are capable of generating information relating to the road 20. This information makes it possible to create one or more digital maps M comprising detailed data about the curbs 21 of the road 20, the dividing strips 22, the start and end points of the route, the road signs, the gradient of the road 20, the quality of the road surface (tarmac, gravel, etc.). The digital maps M are, for example, created using the video camera 14. These are then sent to the collision risk analyzer 33.

The means 32 for generating environmental parameters are capable of assisting with the representation of the mobile actors on the road such human beings or animals, as well as immobile obstacles. These mobile actors and immobile obstacles are represented using a low level merging algorithm that combines information originating from a plurality of cameras (for example, at least 5 cameras) distributed on the roof of the vehicle in order to capture information over 360 degrees. These cameras (not shown in FIG. 1) are mainly used to detect said mobile actors and said immobile obstacles in order to identify their category c (mobile or immobile, human being or animal, etc.). This information is then combined with the LIDAR sensor 15, which will supply a distance d relative to the motor vehicle 10 for each mobile actor and/or for each immobile obstacle. The means 32 for generating environmental parameters comprise a plurality of 3D boxes that refer to the overall context in which the motor vehicle 10 is traveling, so that it is possible to give each mobile actor and each immobile obstacle given x, y coordinates on the digital map(s) M of the means 31 for generating a map. For each mobile actor and for each immobile obstacle j, the means 32 for generating environmental parameters are capable of generating an environmental parameter $Pext_j$, where j is a natural number between 0 and N. Each environmental parameter $Pext_j$ thus comprises information about the category $c_j$ of the mobile actor or immobile obstacle, information about the coordinates $x_j$, $y_j$ of the mobile actor or immobile obstacle, and a distance $d_j$ of the mobile actor or immobile obstacle relative to the motor vehicle 10. All of the environmental parameters $Pext_j$ ($c_j$; $x_j$, $y_j$; $d_j$) are thus sent to the collision risk analyzer 33.

The digital maps M and the environmental parameters $Pext_j$ ($c_j$; $x_j$, $y_j$; $d_j$) supply a good view of the environment in which the motor vehicle 10 is made to travel.

The collision risk analyzer 33 is capable of receiving the digital maps M and the environmental parameters $Pext_j$. More particularly, the collision risk analyzer 33 is able to determine, for each environmental parameter $Pext_j$, an associated risk $R_j$. To this end, the risk analyzer is capable of predicting in real time the changes in mobile actors and/or immobile obstacles on the road. The risk analyzer will send all of the parameters $Pext_j$ and their associated risk $R_j$ to the means 37 for determining a command.

The means 34 for collecting data internal to the motor vehicle are capable of collecting all of the internal parameters $P_{int}$ of the motor vehicle 10. These parameters are determined on the basis of the different onboard sensors. These internal parameters $P_{int}$ relate, in particular, to the steering angle, the speed of the vehicle, the acceleration of the vehicle, and the angular yaw velocity of the vehicle. The internal parameters $P_{int}$ also comprise the X and Y coordinates of the center of mass of the motor vehicle 10. These internal parameters $P_{int}$ are suitable for being sent to the means 36 for determining a lateral offset.

The means 35 for generating a predetermined trajectory are capable of supplying the trajectory that the vehicle must follow in the short term. This predetermined trajectory is supplied by the navigation system. As a variant, the predetermined trajectory is obtained from a camera that scans the curb 21 of the lane in which the motor vehicle 20 is traveling and the dividing strips 22. In a normal operating mode, this predetermined trajectory is half way between the curb 21 and the dividing strips 22. In this case, the generation means 35 will supply one or more pairs of predetermined coordinates $X_{pred}$, $Y_{pred}$ to the means 36 for determining a lateral offset. In this case, these pairs of coordinates correspond to a predetermined trajectory $T_p$ over a given time sequence.

The means 36 for determining a lateral offset are capable of determining a lateral offset $D_L$ between the predetermined trajectory $T_p$ and the actual trajectory $T_r$ of the motor vehicle. To this end, the computer 36 compares the coordinates X, Y of the center of mass of the motor vehicle 10 with the predetermined coordinates $X_{pred}$, $Y_{pred}$. Here, it is a two-dimensional approach. The means 36 then send the lateral offset $D_L$ to the means 37 for determining a command and the human-machine interface means 39.

The means 37 for determining a command are capable of receiving the environmental parameters $Pext_j$ and their associated risk $R_j$ as well as the lateral offset $D_L$. On the basis of this information, the determining means 37 generate a command K for controlling the steering means of the motor vehicle, so as to correct the lateral offset $D_L$. This command K is then sent to the means 38 for controlling the lateral offset as well as to the human-machine interface means 39.

On the basis of the lateral offset $D_L$ received, the means 38 for controlling the lateral offset will act on steering means (not shown). These steering means will change the steering angle of the motor vehicle 10 so as to decrease the lateral offset $D_L$. As is known, these steering means can comprise a steering column, a steering box, a rack, connecting rods, and steering knuckles.

The human-machine interface means 39 are capable of receiving information about the lateral offset $D_L$ and information about the command K. On the basis of this information, the interface means 39 can warn the driver of an anomalous situation. Such an anomalous situation occurs when the lateral offset $D_L$ received by the human-machine interface means 39 is greater than a given reference value. In an alternative embodiment, such an anomalous situation also occurs when the command K requires very fast action on the steering means in order to reduce the lateral offset $D_L$. As a result, the driver has the option of taking control of the vehicle to avoid any risk of an accident. This is autonomy level 3, where the level of automation is conditional. More particularly, the interface means 39 have a visual component and/or an audible component in order to inform the driver of the situation. The visual component is produced using LEDs installed inside the vehicle. By way of illustration, if no risk is detected, the LEDs are blue, informing the driver that automatic mode is activated. When a slight risk is detected (another vehicle traveling in the opposite direction close to the motor vehicle 10, narrow road, etc.), the LEDs take on an orange color. In this case, the driver must increase their vigilance. When a significant risk is detected, the LEDs have a red color and the driver is invited to take control of the vehicle.

Figure 4:
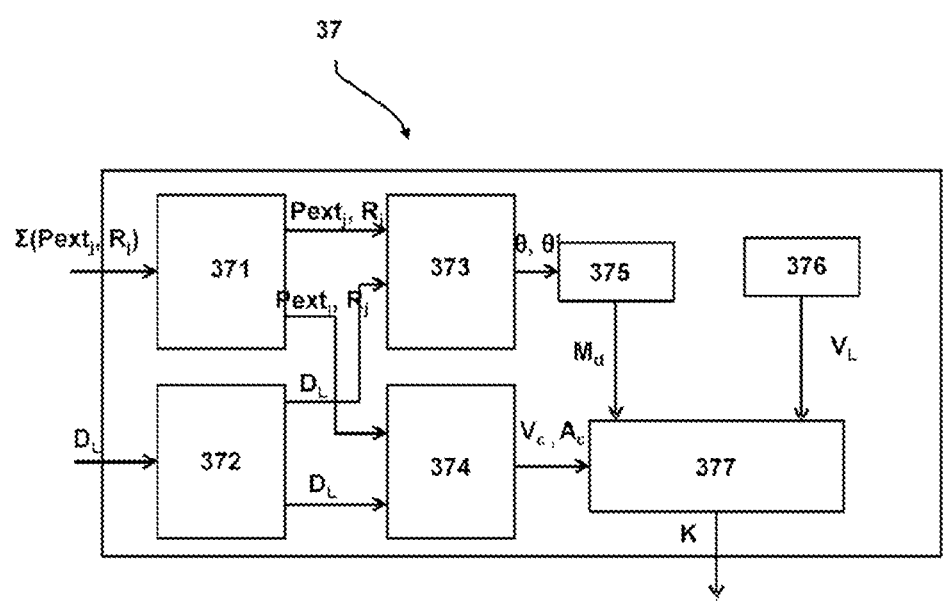
FIG. 4 is a diagram illustrating means for determining a command for controlling the steering means of the motor vehicle in FIG. 1, said command means belonging to the control system in FIG. 3.

FIG. 4 shows details of the different components of the determining means 37. These determining means 37 comprise:

means 371 for selecting at least one environmental parameter $Pext_j$;

means 372 for receiving a lateral offset $D_L$;

means 373 for determining steering angle properties;

means 374 for generating properties of a response of the motor vehicle;

means 375 for generating a model of the steering means;

a model 376 of the vehicle;

means 377 for generating the command K.

The selecting means 371 receive all of the environmental parameters $Pext_j$ as well as the collision risk $R_j$ associated with each of these environmental parameters. On the basis of these data, the selecting means are capable of selecting the environmental parameter(s) posing significant risks. This environmental parameter selection is sent to the means 373 for determining steering angle properties as well as to the means 374 for generating properties of the response of the motor vehicle.

The receiving means 372 are capable of receiving a lateral offset $D_L$ and sending it to the determining means 373 and to the generating means 374.

The determining means 373 are capable of determining an optimum steering angle θ and an optimum angular steering velocity θ' on the basis of the collision risk $R_j$ associated with the environmental parameter $Pext_j$ and the lateral offset $D_L$. The determining of the steering angle θ and the angular steering velocity θ' also takes into account the maximum capabilities of the steering means of the motor vehicle. This information θ, θ' is then sent to the model 375 of the steering means.

The generating means 374 are capable of determining the properties the response of the motor vehicle 10 as a function of the collision risk $R_j$ associated with the environmental parameter $Pext_j$ and the lateral offset $D_L$. The properties of this response relate to the speed of correction $V_c$ of the lateral offset (slow or fast) as well as the damping $A_c$ of this correction over time (short or long). If this collision risk $R_j$ is low and the lateral offset $D_L$ is also small, the properties of the response of the motor vehicle will give a slow correction speed with a short damping time. Such a short damping time makes it possible to return the motor vehicle 10 to the predetermined trajectory $T_d$ with a small oscillation by limiting the overshoot amplitudes around this predetermined trajectory $T_d$.

The generating means 375 are capable of generating a model $M_d$ of the steering means on the basis of the optimum steering angle θ and the optimum steering velocity θ' sent by the determining means 373. In one particular embodiment, this model $M_d$ of the steering means is a second-order linear time-invariant (LTI) model.

The model 376 of the vehicle is capable of supplying the yaw behavior of the vehicle, such as the yaw angle and its derivative parameters (angular yaw velocity, yaw acceleration). Observing the yaw behavior of the motor vehicle gives information about the quality of guidance of said motor vehicle. In one particular embodiment, an angular yaw velocity $V_L$ can be deduced from the optimum steering angle θ and the optimum steering velocity θ'.

The generating means 377 generate the command K on the basis of:

the speed of correction $V_c$ of the lateral offset and the damping $A_c$ of the correction over time;

the model $M_d$ of the steering means;

the angular yaw velocity $V_L$.

The command K is therefore partially determined according to said collision risk $R_j$ via the correction speed $V_c$ and the damping $A_c$. The command K is also partially determined according to the lateral offset $D_L$ via the model $M_d$ of the steering means.

Figure 5:
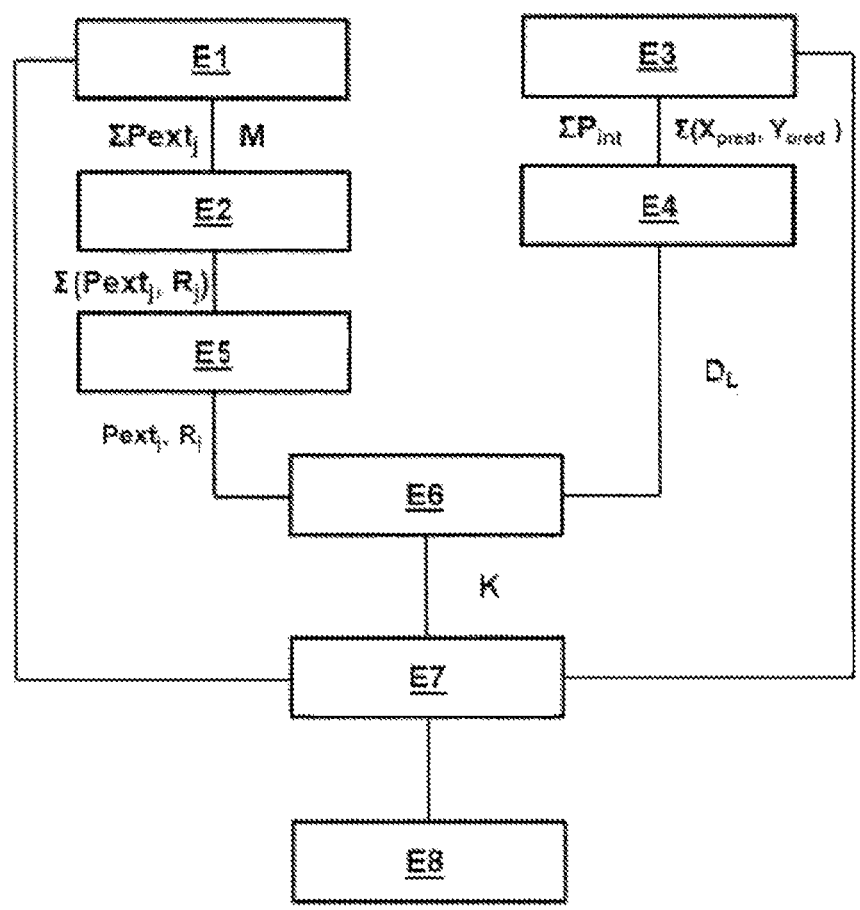
FIG. 5 is a diagram illustrating different steps of a control method for controlling the lateral movement of the motor vehicle in FIG. 1, said control method being implemented by the control system in FIG. 3.

FIG. 5 shows the different steps of a control method for controlling the lateral movement of the motor vehicle 10.

This control method comprises a first step E1 of acquiring parameters external to the motor vehicle. These external parameters comprise digital maps M and environmental parameters $Pext_j$. The environmental parameters $Pext_j$ are parameters selected from the following list of parameters:

a parameter representing the road traffic;

a parameter representing a mobile actor on the road, such as a human being or an animal;

a parameter representing an immobile obstacle on the road.

In a second step E2, a collision risk $R_j$ is determined for each external environmental parameter. In parallel with the first step E1 and the second step E2, the control method comprises a third step E3 of acquiring parameters internal to the motor vehicle. On the basis of these internal parameters, it is possible to deduce, in a fourth step E4, a lateral offset $D_L$ of the motor vehicle relative to a predetermined trajectory $T_p$. In a fifth step E5, at least one external environmental parameter $Pext_j$ is selected. This selection is a function of the collision risk $R_j$ associated with said environmental parameter $Pext_j$. Typically, in the fifth step E5 the environmental parameter that poses the highest risk of collision with the motor vehicle 10 is selected. This environmental parameter is for example linked to another motor vehicle present on the opposite side of the road and traveling in the opposite direction to said motor vehicle 10.

The sixth step E6 relates to a step of determining a command K for controlling the steering means of the motor vehicle. This command K of the steering means is determined according to the collision risk $R_j$ of the selected environmental parameter $Pext_j$ and according to the lateral offset $D_L$ of the motor vehicle 10.

In a seventh step E7, steering means change the direction of the motor vehicle 10 as a function of the command K, so as to correct the lateral offset $D_L$. The speed of correction of the lateral offset $D_L$ is adjusted as a function of the collision risk $R_j$ and the significance of said lateral offset $D_L$. The correction of the lateral offset $D_L$ is thus slowed down if the collision risk $R_j$ is low in light of the lateral offset $D_L$ of the motor vehicle. Likewise, the correction of the lateral offset $D_L$ is accelerated if the collision risk $R_j$ is high in light of the lateral offset $D_L$ of said motor vehicle 10. In addition, the correction of the lateral offset $D_L$ is damped $A_c$ as a function of the collision risk $R_j$ and the significance of this lateral offset $D_L$. This is intended to limit the phenomena of oscillation of the actual trajectory $T_r$ of the motor vehicle around the predetermined trajectory $T_p$.

In an eighth step E8, the control method comprises a step of information in the motor vehicle. This visual and/or audible information is intended for the driver. It makes it possible to inform said driver of a traveling situation of the motor vehicle. For example, this visual and/or audible information can prompt the driver to retake control of the steering means of the motor vehicle in the event of danger.

It will be noted that steps E1 to E7 take place at a predetermined frequency of the order of 0.01 seconds. This frequency is sufficiently short to allow great responsiveness of the motor vehicle 10, in particular in relation to changes in the environmental parameters and their associated risk.

Figure 6:
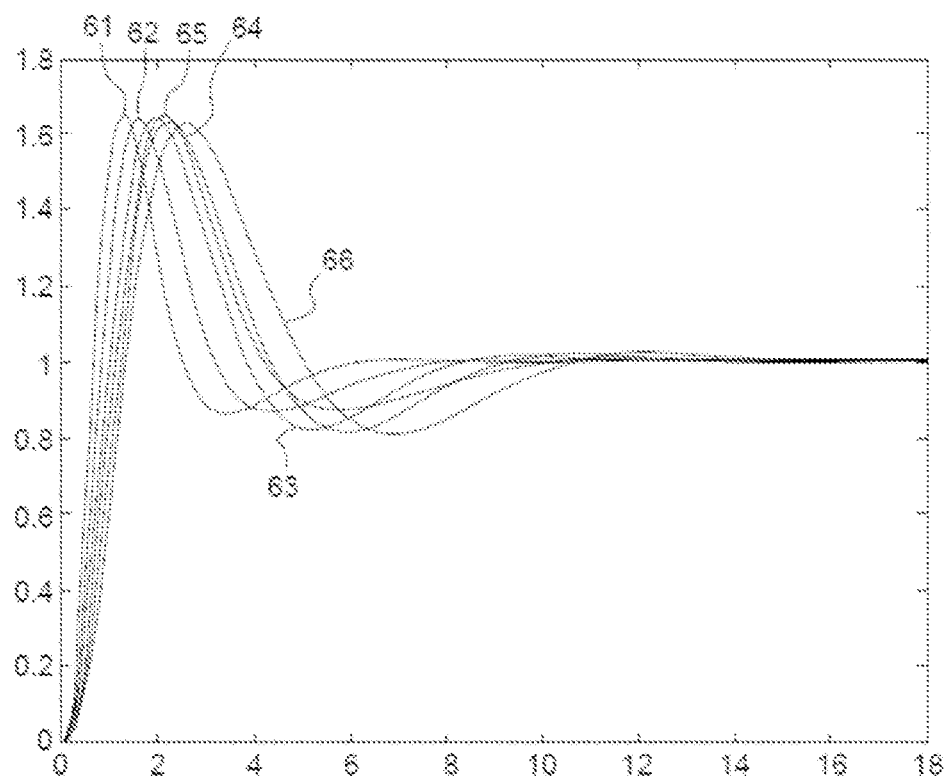
FIG. 6 illustrates responses of the motor vehicle 10 as a function of different lateral distance $D_L$ input values.

FIG. 6 illustrates responses of the motor vehicle 10 according to different lateral distances $D_L$ measured relative to the predetermined trajectory $T_p$. The curve 61 thus illustrates the response of the motor vehicle 10 when the lateral distance $D_L$ is 5 cm. The curve 62 illustrates the response for a lateral distance $D_L$ of 10 cm. The curve 63 illustrates the response for a lateral distance $D_L$ of 15 cm. The curve 64 illustrates the response for a lateral distance $D_L$ of 20 cm. The curve 65 illustrates the response for a lateral distance $D_L$ of 25 cm. The curve 66 illustrates the response for a lateral distance $D_L$ of 30 cm. The x-axis of these curves represents a time in seconds and the y-axis represents a response amplitude. These different curves show that the greater the lateral distance $D_L$, the slower the response of the motor vehicle 10 for returning to the predetermined trajectory. This response is thus more natural and more comfortable for the passengers. This response strategy is particularly suitable when there is no traffic coming in the opposite direction. If there is a significant amount of traffic coming in the opposite direction, the response of the motor vehicle 10 can be faster, in particular in the specific case in which the motor vehicle tends to drift towards the dividing strips on the road. In this specific case, the damping time of the correction can be longer than for curves 61 to 66 with a more marked oscillation around the predetermined trajectory $T_p$.

Figure 7:
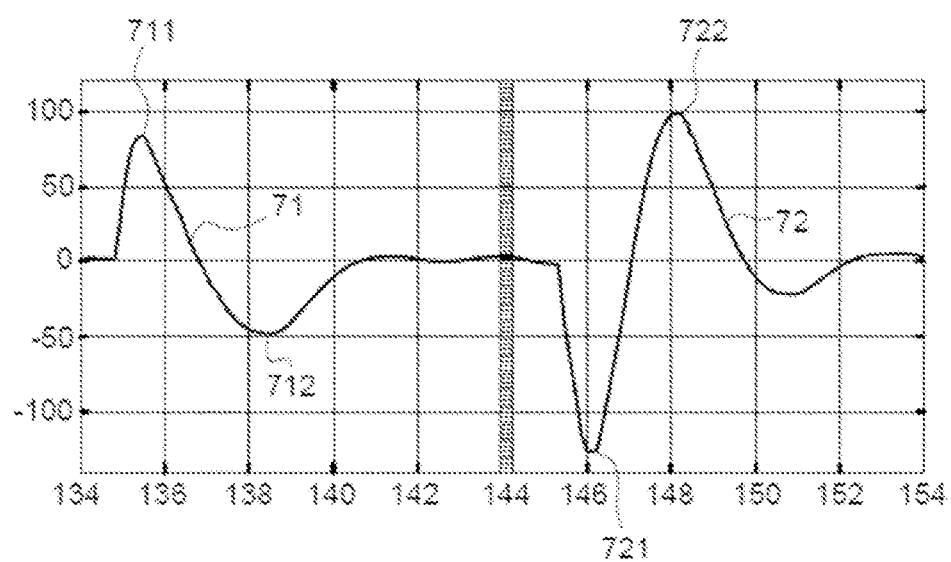
FIG. 7 illustrates the change over time of a steering angle applied by the control system in FIG. 3 and the change over time of a steering angle applied by a conventional control system.
Figure 8:
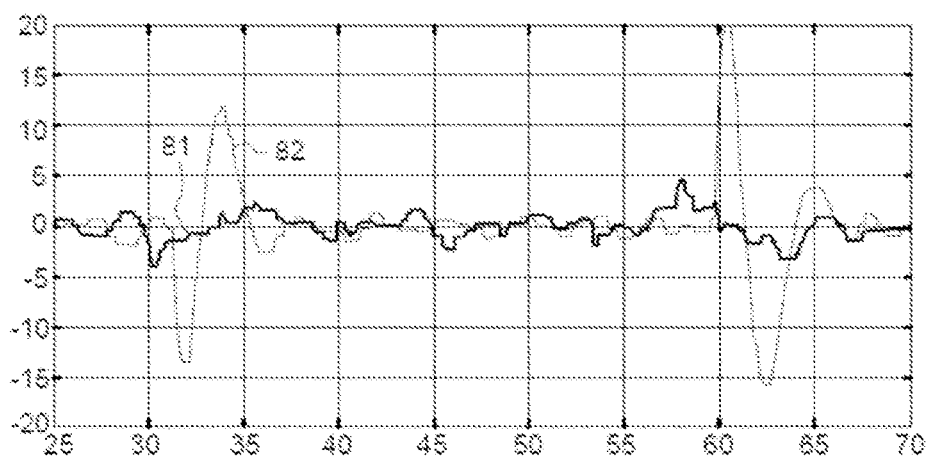
FIG. 8 illustrates superposed changes of steering angle controlled by the control system in FIG. 3 and by a conventional control system, in the case of a low risk of collision.
Figure 9:
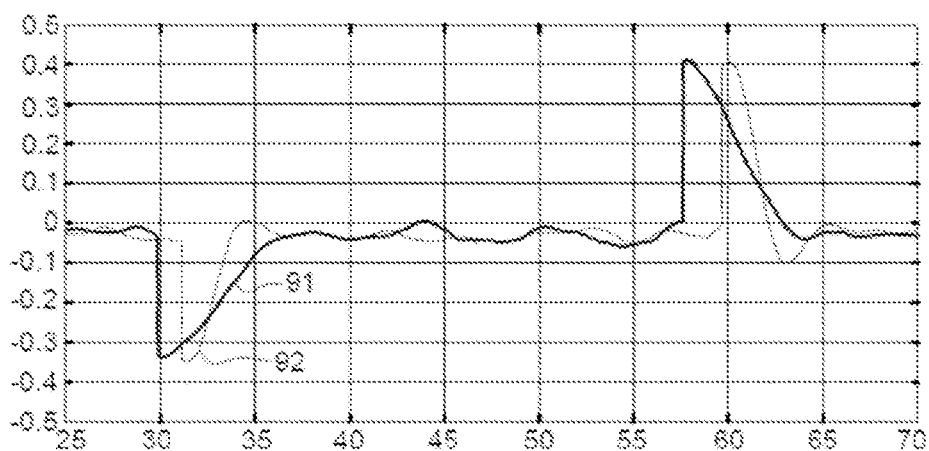
FIG. 9 illustrates superposed changes of steering angle controlled by the control system in FIG. 3 and by the conventional control system, in the case of a high risk of collision.

The associated control method and control system 30 were checked on a test circuit in a mixed portion comprising straight lines and bends. A first test was carried out to compare the control system 30 of the invention with a conventional control system that does not take into account the environmental parameters. FIGS. 7 to 9 illustrate the results of these tests. More particularly, FIG. 7 compares the change over time of a steering angle applied by the control system 30 (curve 71) and the change over time of a steering angle θ applied by the conventional control system (curve 72). On curve 71, at second 134, the motor vehicle is controlled in order to change lane, for example, to overtake another vehicle. The control system 30 will then trigger a sudden change in the steering angle to engage in this overtaking maneuver. This sudden change generates, at second 135, a first peak 711 with a steering angle value θ of around 90° as an absolute value. The motor vehicle is then redirected towards the predetermined trajectory by another change of steering angle generating a second peak 712 at second 139. This second peak 712 has a smaller steering angle value θ of around 50° as an absolute value. The steering angle then stabilizes around 0°, with the vehicle traveling along the predetermined trajectory again. The curve 72 reflects the change over time of a steering angle θ applied by the conventional control system during an overshoot equivalent to that of the curve 71. This curve 62 comprises a first peak 721 greater than 100° as the steering angle and a second peak 722 also around 100°. The steering angle values of the peaks of the curve 72 are significantly greater than those of the peaks of the curve 71. Likewise, the amplitude between the first peak 721 and the second peak 722 is greater than the amplitude between the first peak 711 and the second peak 712 of the curve 71. The control system 30 thus makes it possible to limit large movements of the steering wheel, making the driving of the motor vehicle more comfortable for the passengers. In addition, the control system 30 ensures faster stabilization of the motor vehicle on the predetermined trajectory $T_p$.

FIG. 8 compares the changes in steering angle when it is controlled by the control system 30 (curve 81) and when it is controlled by a conventional control system (curve 82). These curves 81 and 82 are subject to a first intervention at 32 seconds and a second intervention at 62 seconds. It will be noted again that the curve 81 associated with the control system 30 does not overreact to the interventions, unlike the curve 82 of the conventional control system, which has large amplitudes. The control system 30 incorporates the collision risk into its decision-making. When this risk is low or even non-existent, the lateral offset of the motor vehicle can be corrected quite smoothly. The curve 81 thus develops in an almost stable manner, with a limited amplitude around the value 0.

FIG. 9 illustrates a situation in which the collision risk is high for at least one external environmental parameter. This FIG. 9 shows the variations in a lateral offset $D_L$ as a function of time for the control system 30 (curve 91) and for the conventional control system (curve 92). Here, the curve 91 for the control system 30 has generally the same amplitude as the curve 92 for the conventional control system. However, it will be observed that the return to zero is slower for the curve 91 than for the curve 92. The lateral offset of the motor vehicle is thus corrected more smoothly by the control system 30.

The control method for controlling the lateral movement of the motor vehicle and the associated control system 30 thus make it possible to:
 adjust the response of the motor vehicle 10 to its environment in real time;
 have a response that takes into account both parameters internal to the motor vehicle 10 and environmental parameters external to said motor vehicle 10;
 provide great comfort and great safety for the passengers of the motor vehicle 10;
 to quickly provide the driver with information about the need or otherwise to retake control of the steering means of the motor vehicle 10, in particular in the event of danger.

The invention also relates to a computer program product comprising program instructions that can be used by the control system 30 which, when they are executed or interpreted by said control system 30, trigger the implementation of the control method as described in FIG. 5.

The invention also relates to a motor vehicle 10 comprising the control system 30. This motor vehicle is a passenger vehicle, as shown in FIG. 1 and FIG. 2. As a variant, the motor vehicle is any other vehicle such as a bus or a truck.

The invention is not limited to the embodiments and variants described, and further embodiments and variants will be clearly apparent to a person skilled in the art.

The invention claimed is:
1. A control method for controlling a lateral movement of a motor vehicle, the motor vehicle comprising steering means for following a predetermined trajectory on a road, said steering means being configured to change a direction of said motor vehicle, said method comprising:
 determining a lateral offset of said motor vehicle relative to said predetermined trajectory;
 determining a command for controlling the steering means of the motor vehicle to correct the lateral offset;
 selecting at least one environmental parameter external to the motor vehicle, said selecting being a function of a collision risk with said motor vehicle, the command for the steering means being determined according to said collision risk and according to said lateral offset of the motor vehicle; and
 acting on the steering means according to said command to correct the lateral offset of the motor vehicle,
 wherein a speed of correction of the lateral offset is adjusted as a function of said collision risk and said lateral offset.

2. The control method as claimed in claim 1, in which the environmental parameter is at least one parameter selected from the following list of parameters:
 a parameter representing road traffic;
 a parameter representing a mobile actor on the road; and a parameter representing an immobile obstacle on the road.

3. The control method as claimed in claim 2, in which the mobile actor on the road is a human being or an animal.

4. The control method as claimed in claim 1, in which the correction of the lateral offset is slowed down when the collision risk is low in light of the lateral offset of said motor vehicle.

5. The control method as claimed in claim 1, in which the correction of the lateral offset is accelerated when the collision risk is high in light of the lateral offset of said motor vehicle.

6. The control method as claimed in claim 1, in which the correction of the lateral offset is damped as a function of said collision risk and said lateral offset.

7. The control method as claimed in claim 1, further comprising receiving information in the motor vehicle, said information relating to a traveling situation of said motor vehicle.

8. A non-transitory computer readable medium storing a program that, when executed by a computer, causes the computer to execute the control method as claimed in claim 1.

9. The control method as claimed in claim 1, further comprising:
   determining a plurality of environmental parameters, the at least one environmental parameter being selected from the plurality of environmental parameters; and
   determining the collision risk for each environmental parameter of the plurality of environmental parameters.

10. A control system for controlling a lateral movement of a motor vehicle, the vehicle comprising steering means for following a predetermined trajectory on a road, said steering means being configured to change a direction of said motor vehicle, said system comprising:
   means for determining a lateral offset of said motor vehicle relative to said predetermined trajectory;
   means for determining a command for controlling the steering means of the motor vehicle for correcting the lateral offset;
   means for selecting at least one environmental parameter external to the motor vehicle, said selection of said environmental parameter being a function of a risk of collision with said motor vehicle, the command for the steering means being determined according to said collision risk and according to said lateral offset of the motor vehicle; and
   an actuator configured to act on the steering means according to said command to correct the lateral offset of the motor vehicle,
   wherein a speed of correction of the lateral offset is adjusted as a function of said collision risk and said lateral offset.

11. The control system as claimed in claim 10, further comprising human-machine interface means for informing a passenger of a traveling situation of said motor vehicle.

12. An autonomous motor vehicle comprising the control system as claimed in claim 10.

13. The control system as claimed in claim 10, further comprising:
   means for determining a plurality of environmental parameters, the at least one environmental parameter being selected from the plurality of environmental parameters; and
   means for determining the collision risk for each environmental parameter of the plurality of environmental parameters.

* * * * *